United States Patent
Kong et al.

(10) Patent No.: US 11,325,502 B2
(45) Date of Patent: May 10, 2022

(54) ELECTRIC VEHICLE

(71) Applicant: LG CHEM, LTD., Seoul (KR)

(72) Inventors: Chang Sun Kong, Daejeon (KR); Jae Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 89 days.

(21) Appl. No.: 16/644,190

(22) PCT Filed: Sep. 20, 2018

(86) PCT No.: PCT/KR2018/011087
§ 371 (c)(1),
(2) Date: Mar. 4, 2020

(87) PCT Pub. No.: WO2019/059656
PCT Pub. Date: Mar. 28, 2019

(65) Prior Publication Data
US 2020/0231066 A1    Jul. 23, 2020

(30) Foreign Application Priority Data

Sep. 25, 2017   (KR) .................... 10-2017-0123186

(51) Int. Cl.
*B60K 6/32* (2007.10)
*B60K 7/00* (2006.01)
(Continued)

(52) U.S. Cl.
CPC ............... *B60L 58/40* (2019.02); *B60L 50/71* (2019.02); *B60L 50/75* (2019.02); *B60K 7/0007* (2013.01)

(58) Field of Classification Search
CPC ........ B60L 58/40; B60L 58/30; B60L 3/0053; B60L 50/71; B60L 50/75; B60L 50/72; B60K 7/0007; B60K 7/00
See application file for complete search history.

(56) References Cited

U.S. PATENT DOCUMENTS 7,118,119 B2 * 10/2006 Amanuma ........... B60K 7/0007
280/124.135
7,637,334 B2 * 12/2009 Kaneko ................. B60K 15/013
903/908
(Continued)

FOREIGN PATENT DOCUMENTS

JP  2004-253337 A  9/2004
JP  2005-269823 A  9/2005
(Continued)

OTHER PUBLICATIONS

European Search Report for Appl. No. 18858497.3 dated Apr. 17, 2020.
(Continued)

*Primary Examiner* — John D Walters
(74) *Attorney, Agent, or Firm* — Birch, Stewart, Kolasch & Birch, LLP

(57) ABSTRACT

An electric vehicle includes first to fourth motors respectively mounted to individually rotate right and left wheels in the front and rear of the vehicle, first to fourth fuel cell stack modules independently connected to the respective motors so as to supply power to the first to fourth motors, a battery pack for supplying power to the first to fourth motors, a main control part for controlling the first to fourth motors, the first to fourth fuel cell stack modules and the battery pack and a tank for supplying hydrogen gas to the first to fourth fuel cell stack modules.

10 Claims, 4 Drawing Sheets

(51) Int. Cl.
  *B60L 58/40* (2019.01)
  *B60L 50/71* (2019.01)
  *B60L 50/75* (2019.01)

(56) References Cited

U.S. PATENT DOCUMENTS

| | | | | |
|---|---|---|---|---|
| 8,016,061 | B2* | 9/2011 | Jeon | B60L 58/31 |
| | | | | 180/65.285 |
| 9,126,599 | B2* | 9/2015 | Ozaki | H02K 7/116 |
| 9,802,661 | B1* | 10/2017 | Kentley-Klay | G05D 1/0088 |
| 10,166,879 | B2* | 1/2019 | Lee | B60L 58/14 |
| 2004/0094928 | A1 | 5/2004 | Amanuma | |
| 2004/0263099 | A1* | 12/2004 | Maslov | B60L 50/20 |
| | | | | 318/400.24 |
| 2005/0139402 | A1 | 6/2005 | Yamashita | |
| 2006/0185915 | A1 | 8/2006 | Kaneko | |
| 2008/0314663 | A1 | 12/2008 | Yamazaki et al. | |
| 2009/0223726 | A1 | 9/2009 | Jeon, II et al. | |
| 2012/0041621 | A1 | 2/2012 | Marus et al. | |

FOREIGN PATENT DOCUMENTS

| | | |
|---|---|---|
| JP | 2007-129872 A | 5/2007 |
| JP | 2007-181328 A | 7/2007 |
| JP | 2007-305347 A | 11/2007 |
| JP | 2008-154387 A | 7/2008 |
| JP | 2010-004628 A | 1/2010 |
| JP | 2010-97635 A | 4/2010 |
| JP | 2010-276357 A1 | 12/2010 |
| JP | 2011-120390 A | 6/2011 |
| KR | 10-2006-0060003 A | 6/2006 |
| KR | 10-2009-0095082 A | 9/2009 |
| KR | 10-2016-0082907 A | 7/2016 |
| KR | 10-2007-0040143 A | 4/2017 |

OTHER PUBLICATIONS

International Search Report issued in PCT/KR2018/011087 (PCT/ISA/210), dated Dec. 28, 2018.

* cited by examiner

100

ELECTRIC VEHICLE

TECHNICAL FIELD

The present invention relates to an electric vehicle, and more particularly, to an electric vehicle on which a fuel cell stack is mounted.

This application claims the benefit of priority based on Korean Patent Application No. 10-2017-0123186 filed on Sep. 25, 2017, the disclosure of which is incorporated herein by reference in its entirety.

BACKGROUND ART

In recent years, demand for environmentally friendly electric vehicles (EVs) has been increasing due to the trend of the strengthening of global environmental regulations and the reduction of energy costs.

In particular, an in-wheel motor system in which a motor is integrated with a wheel of an electric vehicle to directly rotate the tire is attracting attention as a core technology of a next-generation electric vehicle.

In addition, a battery pack and/or a fuel cell stack are mounted to supply power to motors and various electric devices of electric vehicles.

Generally, a fuel cell is an energy conversion device that generates electrical energy through an electrochemical reaction between a fuel and an oxidizer and has an advantage that electric power can be consistently generated as long as the fuel is continuously supplied.

For example, a polymer electrolyte fuel cell includes a membrane-electrode assembly (MEA) equipped with an electrode layer formed by coating an anode and a cathode around an electrolyte membrane composed of a polymer material. In addition, the fuel cell includes a gas diffusion layer (GDL) for distributing reaction gases evenly throughout the reaction region and serving to transfer electrons generated by the oxidation reaction of the anode electrode toward the cathode electrode, and a bipolar plate for supplying the reaction gases to the gas diffusion layer and discharging the water generated by the electrochemical reaction to the outside.

On the other hand, in the case of the in-wheel motor system, there is an advantage in that power loss can be reduced because individual motors for each wheel are driven independently, whereas the battery pack or the fuel cell stack occupies a large space as a single device, which affects the internal structure design of the vehicle, and causes a problem of deteriorating efficiency of space utilization.

DISCLOSURE

Technical Problem

It is a problem to be solved by the present invention to provide an electric vehicle capable of individually supplying power to a drive motor built in each wheel in an in-wheel motor system, and individually controlling it.

In addition, it is a problem to be solved by the present invention to provide an electric vehicle equipped with fuel cell stack modules having a parallel or distributed connection structure and capable of individual operation and individual control.

Technical Solution

To solve the above-described problems, according to one aspect of the present invention, there is provided an electric vehicle comprising: a first motor, a second motor, a third motor and a fourth motor mounted to individually rotate a first wheel, a second wheel, a third wheel and a fourth wheel of the vehicle, respectively a first fuel cell stack, a second fuel cell stack, a third fuel cell stack and a fourth fuel cell stack independently connected to a respective motor so as to supply power to the first motor, the second motor, the third motor and the fourth moto, respectively; a battery pack for supplying power to the first motor, the second motor, the third motor and the fourth motor; a main controller for controlling the first motor, the second motor, the third motor and the fourth motor, the first fuel cell stack, the second fuel cell stack, the third fuel cell stack and the fourth fuel cell stack and the battery pack; and a tank for supplying hydrogen gas to the first to fourth fuel cell stack modules.

At this time, in the electric vehicle, an inverter, a motor controller and a fuel cell stack module controller may be independently provided for each wheel.

Also, the main controller may be provided to integrally control each of the motor controllers and the fuel cell stack module controllers. That is, the main controller can control the fuel cell stack modules while controlling each motor controller. Furthermore, the main controller can control each of the motor controllers and the fuel cell stack modules according to various road environments and driving situations.

In addition, each of the motor controllers and the fuel cell stack module controllers may be synchronized with the main controller.

Furthermore, each motor can be supplied with main power from one of the fuel cell stack modules, and can be selectively supplied with power from the battery pack. That is, the main controller can control the power supplied to the respective motors, which can control so that the power supplied from the fuel cell stack modules is supplied as the main power source and the power of the battery pack is supplied as an auxiliary power source.

Also, the main controller may be provided to supply power to each motor through the battery pack when a fast load response is required or when supply of peak power is required.

In addition, the battery pack may comprise a high voltage battery used for driving the motor and a low voltage battery for supplying power to the peripheral devices.

Furthermore, the main controller may be provided to perform charging of the battery pack through the fuel cell stack modules when a charged amount of the battery pack falls below a predetermined value.

Also, the main controller may be provided to perform charging of the battery pack by regenerative braking of each motor when the charged amount of the battery pack falls below a predetermined value.

In addition, the main controller may be provided to individually adjust the output of the first motor, the second motor, the third motor and the fourth motor.

At this time, the main controller may be provided to individually adjust the outputs of the first motor, the second motor, the third motor and the fourth motor according to driving situations and road environments. In particular, the main controller may be provided to individually adjust the outputs of the first motor, the second motor, the third motor and the fourth motor so that the efficiency of the fuel cell stack modules is maximized and the fuel consumption is minimized.

Advantageous Effects

As described above, the electric vehicle related to one example of the present invention has the following effects.

The present invention can be applied without changing electric vehicle body shapes (designs).

Also, the efficiency of vehicle body space utilization is increased compared to a single fuel cell stack structure.

In addition, since the distance between the power source (fuel cell stack module) and the motor (electric motor) can be minimized, the power loss can be minimized.

Furthermore, through the plurality of fuel cell stack modules, power can be supplied to low-capacity peripheral devices adjacent to the fuel cell stack module.

Also, control and response characteristics are improved due to miniaturization of the fuel cell stack module.

In addition, it has higher energy efficiency than a single large-capacity fuel cell stack module.

MODE FOR INVENTION

Figure 1:
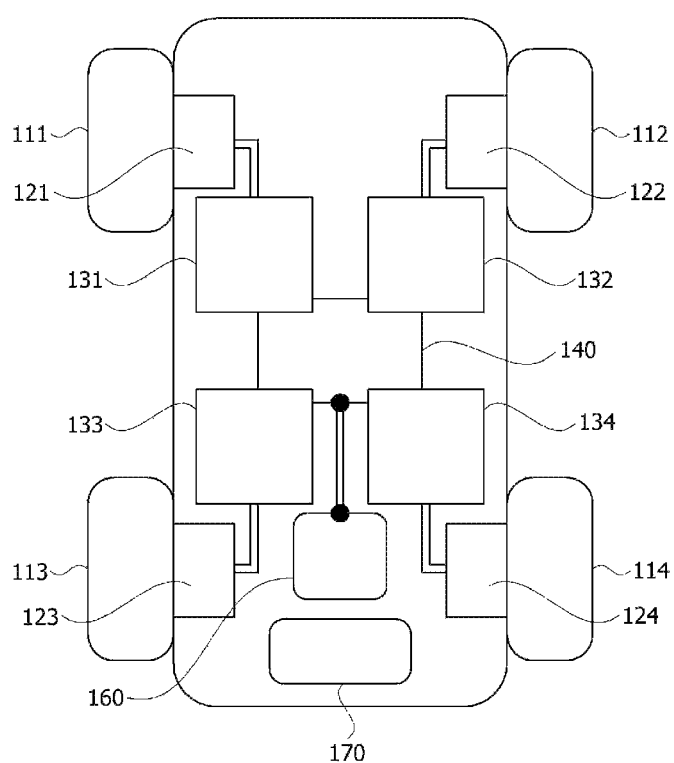
FIG. 1 is a configuration diagram of an electric vehicle related to one example of the present invention.

Hereinafter, an electric vehicle according to one example of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

Figure 2:
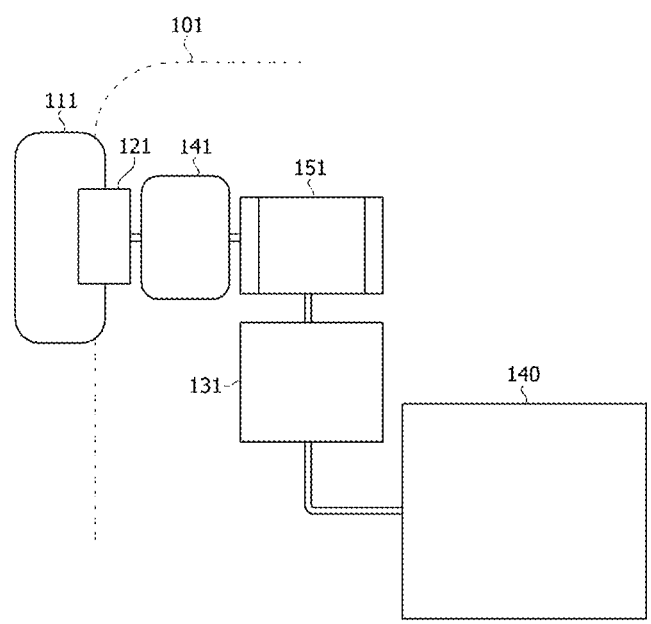
FIGS. 2 and 3 are partial configuration diagrams of an electric vehicle related to one example of the present invention.
Figure 3:
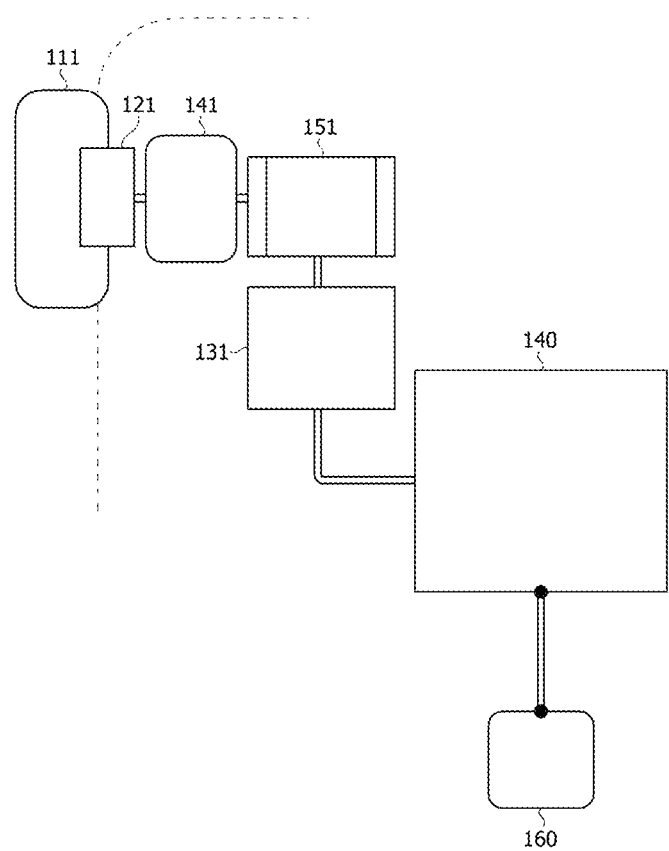
Figure 4:
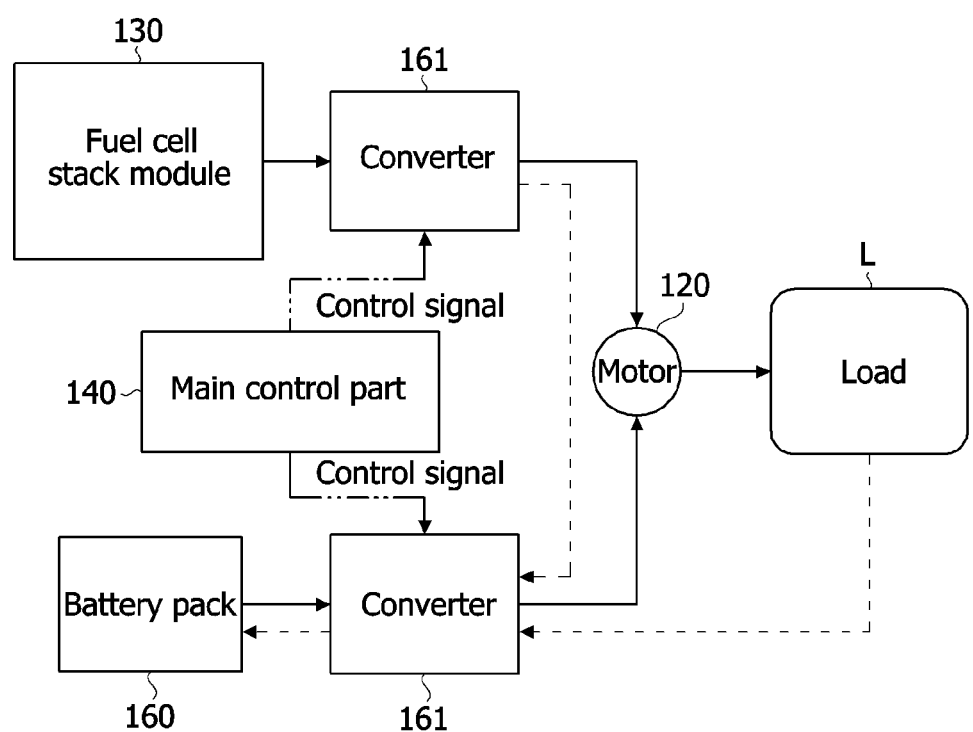
FIG. 4 is a configuration diagram showing a control system of an electric vehicle related to one example of the present invention.

FIG. 1 is a configuration diagram of an electric vehicle related to one example of the present invention, FIGS. 2 and 3 are partial configuration diagrams of an electric vehicle related to one example of the present invention, and FIG. 4 is a configuration diagram showing a control system of an electric vehicle related to one example of the present invention.

An electric vehicle (100) related to one example of the present invention comprises a vehicle body (101). Also, the electric vehicle (100) comprises right and left wheels, for example, four wheels (111, 112, 113, 114), in front and rear of the vehicle.

The electric vehicle (100) comprise a plurality of wheels for driving, a plurality of motors integrally mounted on the wheels to independently drive the wheels, and a plurality of fuel cell stack modules individually connected to the motors to supply power to the motors, respectively. For example, if the respective wheels have all built-in motors, the wheels, the motors and the fuel cell stack modules may all have the same number. Alternatively, when the vehicle is front-wheel drive or rear-wheel drive, the number of motors and fuel cell stack modules may be smaller than the number of wheels.

In one example, the electric vehicle (100) comprise first to fourth motors (121, 122, 123, 124) mounted to individually rotate the right and left wheels (111, 112, 113, 114) in the front and rear of the vehicle, respectively. Each of the motors (121, 122, 123, 124) is integrated into a corresponding wheel, and drives each wheel separately.

Also, the electric vehicle (100) comprises first to fourth fuel cell stack modules (131, 132, 133, 134) independently connected to the respective motors (121, 122, 123, 124) so as to supply power to the first to fourth motors (121, 122, 123, 124) one-to-one, respectively. Each of the fuel cell stack modules (131, 132, 133, 134) may have the same output and size. Furthermore, the electric vehicle according to the present invention has a structure that the small-sized and small-capacity fuel cell stacks are independently connected to the respective wheel sides to supply power, without using a single fuel cell stack for supplying power to all the wheel sides. In addition, the respective fuel cell stack modules (131, 132, 133, 134) are connected in parallel.

Furthermore, the electric vehicle (100) comprises a main control part (140) for controlling the first to fourth motors (121, 122, 123, 124) and the first to fourth fuel cell stack modules (131, 132, 133, 134).

In addition, the electric vehicle (100) comprises a battery pack (160) for supplying power to the first to fourth motors and a tank (170) for supplying hydrogen gas to the first to fourth fuel cell stack modules (131, 132, 133, 134).

Also, in the electric vehicle (100), an inverter, a motor control part and a fuel cell stack module control part may be independently provided for each of the wheels (111, 112, 113, 114). That is, separately from the main control part (140), the inverter (for example, DC/AC inverter), the motor control part and the fuel cell stack module control part are independently provided on each of the first to fourth wheel sides.

For example, referring to FIGS. 2 and 3, a first inverter electrically connected to the first motor (121), a first motor control part (141) for individually controlling the first motor (121), and a first fuel cell stack module control part (not shown) for individually controlling the first fuel cell stack module (131) may be provided on the first motor (121) side.

At this time, the main control part (140) may be provided to integrally control each of the motor control parts (for example, 141) and the fuel cell stack module control parts. Specifically, each of the motor control parts and the fuel cell stack module control parts may be provided to be synchronized with the main control part (140).

As independent control parts are provided for each fuel cell stack module, the control of the operation temperature, the gas flow rate, and the like for each fuel cell stack module is facilitated, and miniaturization of the peripheral devices constituting the fuel cell becomes possible.

On the other hand, the inverter (151) performs a function that the DC power transmitted from the fuel cell stack module (131) or the battery pack (160) is adjusted by a signal from the motor controller and transmitted to the motor.

Each of the motors (120: 121, 122, 123, 124) may be provided so that it is supplied with main power from the fuel cell stack modules (130: 131, 132, 133, 134), and selectively supplied with power from the battery pack (160).

That is, the electric vehicle (100) related to one example of the present invention can be driven by a hybrid electric power supply system of the fuel electric stack modules (130: 131, 132, 133, 134) and the battery pack (160). For example, the battery pack (160) may be provided to supply power to each motor when a fast load response is required or when supply of peak power is required.

Specifically, the fuel cell stack modules (130) are used as a main power source for supplying power to each wheel and the battery pack (160) is used only when a fast load response characteristic such as peak power or start-up is required, so that the efficiency of the overall power supply can be increased.

Referring to FIG. 4, the main control part (140) can determine the degree of hybrid use of the fuel cell stack modules (130) and the battery pack (160) and control the signal transmitted to the converter (161), and the main control part (140) can determine the torque for controlling the motor and transmit the control signal.

In addition, the battery pack (160) may comprise a high voltage battery used for driving the motor and a low voltage battery for supplying power to the peripheral devices.

Also, when the charged amount of the battery pack (160) falls below a predetermined value, the battery pack (160) can be charged by the fuel cell stack modules (130).

Furthermore, when the charged amount of the battery pack (160) falls below a predetermined value, the battery pack (160) can be charged by the regenerative braking of each motor (120) according to the dynamic load (L).

The preferred examples of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the electric vehicle related to one example of the present invention, the efficiency of vehicle body space utilization is increased compared to a single fuel cell stack structure, and through the plurality of fuel cell stack modules, power can be supplied to low-capacity peripheral devices adjacent to the fuel cell stack module.

The invention claimed is:

1. An electric vehicle comprising:
   a first motor, a second motor, a third motor and a fourth motor mounted to individually rotate a first wheel, a second wheel, a third wheel and a fourth wheel of the vehicle, respectively;
   a first fuel cell stack, a second fuel cell stack, a third fuel cell stack and a fourth fuel cell stack independently connected to a respective motor so as to supply power to the first motor, the second motor, the third motor and the fourth motor, respectively;
   a battery pack for supplying power to the first motor, the second motor, the third motor and the fourth motor;
   a main controller for controlling the first motor, the second motor, the third motor and the fourth motor, the first fuel cell stack, the second fuel cell stack, the third fuel cell stack and the fourth fuel cell stack and the battery pack; and
   a tank for supplying hydrogen gas to the first to fourth fuel cell stacks,
   wherein an inverter, a motor controller and a fuel cell stack controller are independently provided for each wheel, and
   wherein the main controller is provided to integrally control each of the motor controller and the fuel cell stack controller.

2. The electric vehicle according to claim 1, wherein each of the motor controllers and the fuel cell stack controllers is synchronized with the main controller.

3. The electric vehicle according to claim 1, wherein each motor is supplied with main power from one of the fuel cell stacks and selectively supplied with power from the battery pack.

4. The electric vehicle according to claim 3, wherein the main controller is provided to supply power to each motor through the battery pack when a fast load response is required or when supply of peak power is required.

5. The electric vehicle according to claim 3, wherein the battery pack comprises a high voltage battery used for driving the motor and a low voltage battery for supplying power to peripheral devices.

6. The electric vehicle according to claim 1, wherein the main controller is provided to perform charging of the battery pack through the fuel cell stacks when a charged amount of the battery pack falls below a predetermined value.

7. The electric vehicle according to claim 1, wherein the main controller is provided to perform charging of the battery pack by regenerative braking of each motor when a charged amount of the battery pack falls below a predetermined value.

8. The electric vehicle according to claim 1, wherein the main controller is provided to individually adjust the output of the first motor, the second motor, the third motor and the fourth motor.

9. The electric vehicle according to claim 8, wherein the main controller is provided to individually adjust the output of the first motor, the second motor, the third motor and the fourth motor according to driving situations and road environments.

10. The electric vehicle according to claim 8, wherein the main controller is provided to individually adjust the output of the first motor, the second motor, the third motor and the fourth motor so that the efficiency of the fuel cell stacks is maximized and the fuel consumption is minimized.

* * * * *